United States Patent
Panicker

(10) Patent No.: US 10,635,474 B2
(45) Date of Patent: Apr. 28, 2020

(54) SYSTEMS AND METHODS FOR VIRTIO BASED OPTIMIZATION OF DATA PACKET PATHS BETWEEN A VIRTUAL MACHINE AND A NETWORK DEVICE FOR LIVE VIRTUAL MACHINE MIGRATION

(71) Applicant: Cavium, LLC, Santa Clara, CA (US)

(72) Inventor: Manojkumar Panicker, Sunnyvale, CA (US)

(73) Assignee: Marvell Asia Pte, Ltd., Singapore (SG)

(*) Notice: Subject to any disclaimer, the term of this patent is extended or adjusted under 35 U.S.C. 154(b) by 221 days.

(21) Appl. No.: 15/590,519

(22) Filed: May 9, 2017

(65) Prior Publication Data

US 2017/0322828 A1   Nov. 9, 2017

Related U.S. Application Data

(60) Provisional application No. 62/333,793, filed on May 9, 2016.

(51) Int. Cl.
| | |
|---|---|
| *H04L 29/06* | (2006.01) |
| *G06F 9/455* | (2018.01) |
| *G06F 12/1081* | (2016.01) |
| *H04L 12/879* | (2013.01) |
| *G06F 9/50* | (2006.01) |
| *G06F 12/14* | (2006.01) |

(52) U.S. Cl.
CPC ...... *G06F 9/45558* (2013.01); *G06F 9/45516* (2013.01); *G06F 9/45545* (2013.01); *G06F 9/5055* (2013.01); *G06F 12/1081* (2013.01); *H04L 49/901* (2013.01); *G06F 12/1491* (2013.01); *G06F 2009/4557* (2013.01); *G06F 2009/45579* (2013.01); *G06F 2009/45595* (2013.01); *G06F 2212/152* (2013.01)

(58) Field of Classification Search
CPC .................................................. H04L 49/901
See application file for complete search history.

(56) References Cited

U.S. PATENT DOCUMENTS

| | | | |
|---|---|---|---|
| 2013/0138836 A1* | 5/2013 | Cohen .............. | H04L 49/351 709/250 |
| 2017/0019328 A1* | 1/2017 | Moreno ............ | H04L 45/22 |

* cited by examiner

*Primary Examiner* — Adnan M Mirza

(57) ABSTRACT

A new approach is proposed that contemplates systems and methods to support virtio-based data packet path optimization for live virtual machine (VM) migration for Linux. Specifically, a data packet receiving (Rx) path and a data packet transmitting (Tx) path between a VM running on a host and a virtual function (VF) driver configured to interact with a physical network device of the host to receive and transmit communications dedicated to the VM are both optimized to implement a zero-copy solution to reduce overheads in packet processing. Under the proposed approach, the data packet Tx path utilizes a zero-copy mechanism provided by Linux kernel to avoid copying from virtio memory rings/Tx vrings in memory of the VM. The data packet Rx path also implements a zero-copy solution, which allows a virtio device of the VM to communicate directly with the VF driver of the network device while bypassing a macvtap driver entirely from the data packet Rx path.

23 Claims, 3 Drawing Sheets

SYSTEMS AND METHODS FOR VIRTIO BASED OPTIMIZATION OF DATA PACKET PATHS BETWEEN A VIRTUAL MACHINE AND A NETWORK DEVICE FOR LIVE VIRTUAL MACHINE MIGRATION

CROSS-REFERENCE TO RELATED APPLICATIONS

This application claims the benefit of U.S. Provisional Patent Application No. 62/333,793, filed May 9, 2016, and entitled "VIRTIO BASED LIVE VM MIGRATION," which is incorporated herein in its entirety by reference.

BACKGROUND

Virtio (virtual I/O or VirIO) is a type of virtualization for network and disk device drivers running on a host/hosting device where these guest drivers are aware of the fact that they are running in a virtual environment and cooperating with a hypervisor of the host to achieve high performance network and disk operations. A vhost-net module is a kernel-level backend module for interfacing with those virtio based devices that reduces virtualization overhead by moving virtio packet processing tasks out of user space and loaded into kernel space of memory of the host.

When a virtio based vhost-net module is adopted for a communication path of network packets between a virtual machine (VM) running on the host and a virtual function (VF) driver of a physical networking device, the virtio memory queues—transmission (Tx) and Rx virtio memory rings or vrings—for transmitting and receiving the network packets, respectively, are allocated in the VM's memory space, wherein allocation of the Tx and Rx vrings and their buffers are managed by virtio driver running in the VM. The VM's memory space can be managed by a VM monitor such as Qemu, which provides a layout of the VM memory to the vhost-net module so that it can directly translate the buffer addresses.

Although the vhost-net module allows the virtio back-end to be managed in the kernel, it needs a mechanism to get the packets in and out of an actual/physical network device. In some current systems, this mechanism is provided by a macvtap driver, which is a type of device driver that provides a socket that the vhost-net module can poll to receive the packets or use send calls to send the packets. On the other end, the macvtap driver associates the socket with the actual physical network device coupled to the host system, wherein the network device provides actual physical connectivity for the data packet paths between the VM and the network. However, the use of the socket and the fact the VM memory is not directly accessible by the VF driver means that Tx and Rx buffers from the VM's virtio memory rings would need to be copied into the network device's physical Tx & Rx rings. While the use of the vhost-net module reduced latency significantly, there still is substantial overhead due to the copy mechanism involved in the Tx and Rx data packet paths.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
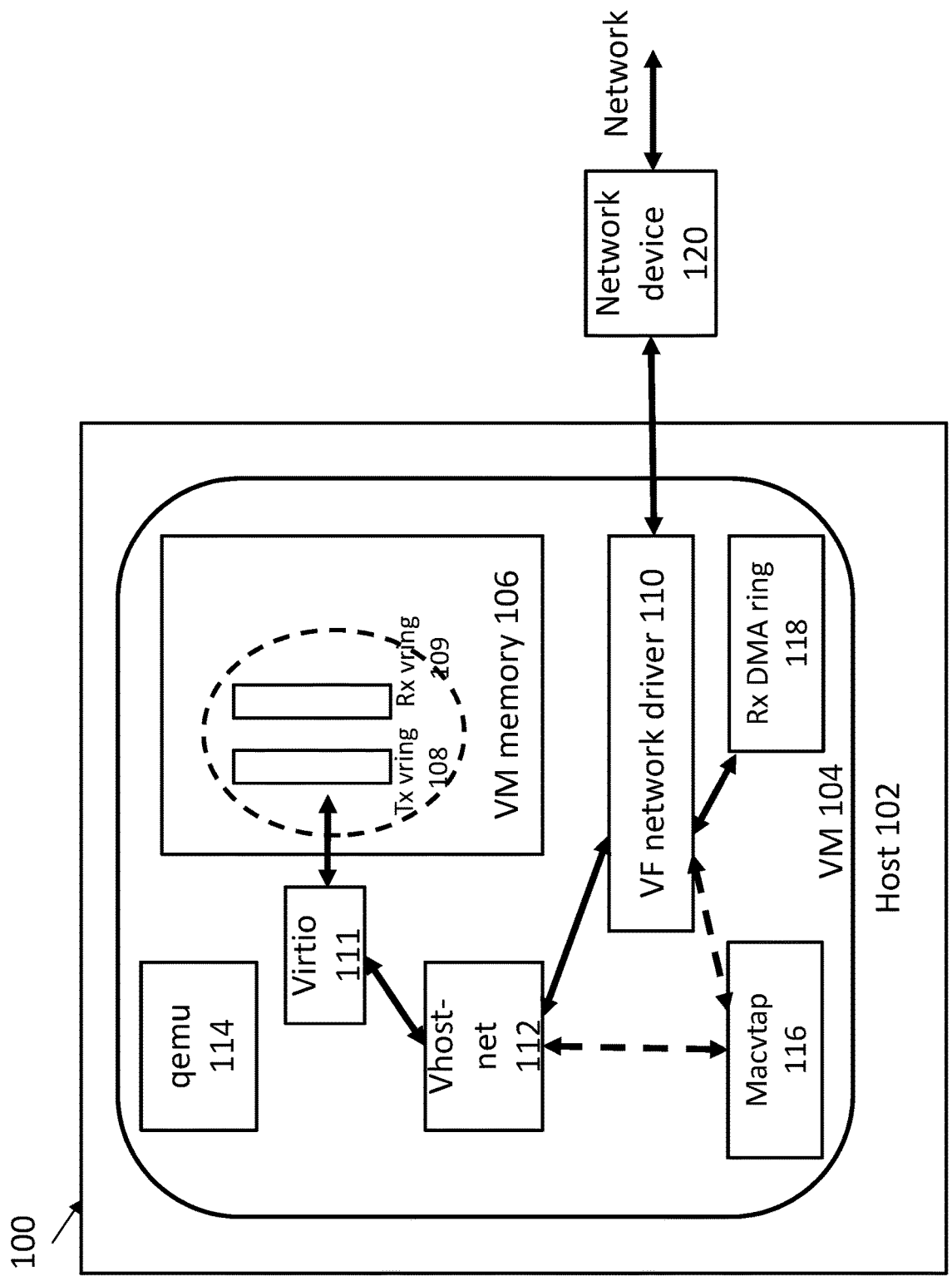
FIG. 1 depicts an example of a diagram of a system configured to support virtio-based data packet path optimization for live VM migration in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support virtio-based data packet path optimization for live virtual machine (VM) migration for Linux. Specifically, a data packet receiving (Rx) path and a data packet transmitting (Tx) path between a VM running on a host and a virtual function (VF) driver configured to interact with a physical network device of the host to receive and transmit communications (e.g., packets) dedicated to the VM are both optimized to implement a zero-copy solution to reduce overheads in packet processing. Under the proposed approach, the data packet Tx path utilizes a zero-copy mechanism provided by Linux kernel to avoid copying from virtio memory rings/Tx vrings in memory of the VM. The data packet Rx path also implements a zero-copy solution, which allows a virtio device of the VM to communicate directly with the VF driver of the network device while bypassing a macvtap driver entirely from the data packet Rx path.

By enabling the zero-copy solution for the both the data packet Tx and Rx paths between the VM and the VF network driver of the network device, the proposed approach enables the VM and its virtio devices to interact directly with the VF network driver of the network device for exchange of the data packets while bypassing (not copying to) the macvtap driver. As such, the proposed approach further reduces the copying overhead for the data packet Tx and Rx paths, making live migration of the VM between different hosts more efficient.

FIG. 1 depicts an example of a diagram of a system 100 configured to support virtio-based data packet path optimization for live VM migration. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a server/host 102 having a VM 104 running on it and in communication with a network device 120. Here, the host 102 can be, but is not limited to, an x86, OCTEON, or ARM based device/system/server. For a non-limiting example, the network device 120 is a hardware-based, software-programmable Ethernet network interface card (NIC), which often includes a multi-core network packet processing engine to support flexible packet processing at various I/O rates (e.g., 10, 25, and 40 Gbps). Although NIC is used as a non-limiting example in the following discussions, a person ordinarily skilled in the art would have understood that the same approach can also be applied to other types of networking devices.

As shown by the example of FIG. 1, the host 102 and the NIC 120 are configured to communicate with each other over a bus via a VF network device driver (e.g., VF NIC driver) 110, wherein the NIC 120 is configured to service/perform network communications of network packet traffic to and from VM 104 running on the host 102 over a network (not shown) following certain communication protocols such as TCP/IP protocol. Such network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

In the example of FIG. 1, the VF NIC driver 110 is configured to interact with the physical NIC 120 of the host 102 to receive and transmit communications (e.g., network data packets) dedicated for the VM 104. When a network packet is being sent out by the VM 104 to the NIC 120 along a packet data transmission (Tx) path, it is first added to the Tx vring 108 of the VM memory 106 and processed for transmission by a vhost-net module 112 (after the vhost-net module 112 is notified by doorbell rings such as eventfd in the vhost-net module 112). To avoid the significant overhead for copying the packet from the Tx ring 108 to the buffer of the host 102 as discussed above, the vhost-net module 112 is configured to utilize a zero-copy mechanism provided by the Linux kernel of the host 102 to provide a zero copy transmitting mechanism for the packet from the VM 104, wherein the zero copy transmitting mechanism modifies macvtap module 116 to avoid copying the packet from the Tx vring 108. As such, the macvtap module 116 is still used in the packet data Tx path without incurring any overheads form copying. The macvtap module 116 then sends the packet to the VF NIC driver 110, which transmits the packet to the network via the NIC 120. Alternately, the vhost-net module 112 could be further modified to present the packer data in the Tx vring 108 directly to the VF NIC driver 110 while bypassing the macvtap module 116.

In some embodiments, when a virtio ring (Tx vring 108 or Rx vring 109) is associated with a virtio device 111 of the VM 104, the Tx vring 108 is presented to the VF NIC driver 110 by the vhost-net module 112 and the VF NIC driver 110 selects the packet in the next available slot in the Tx vring 108 to send the packet to the physical NIC 120. In some embodiments, the VF NIC driver 110 is also configured to send control commands using the Tx vring 108 as well, wherein the control commands would arrive in the firmware of the NIC 120 in the same order with respect to the Tx packets as they were dispatched from the host 102.

When a network packet is received by the physical NIC 120 and needs to be provided to the VM 104 along a data packet receiving (Rx) path, it is first send to the VF NIC driver 110. To implement zero copy functionality for the data packet Rx path, the VF NIC driver 110 is configured to directly access the buffers available in the Rx vring 109 of the memory of the VM 104 for the host's virtio device 111. The VF NIC driver 110 and the vhost-net module 112 complete a handshake, wherein the vhost-net module 112 lets the VF NIC driver 110 know which Rx buffers of the Rx vring 109 should be associated with the VF NIC driver 110, which then requests the vhost-net module 112 for the Rx buffers from the Rx vring 109. The vhost-net module 112 is also configured to provide the next available buffer from the Rx vring 109 and the index of that buffer. When the packet arrives from the VF NIC driver 110 of the physical NIC 120, it is saved directly (direct memory accessed) into the Rx vring 109. In some embodiments, the vhost-net module 112 continues to use a poll based mechanism to poll the VF NIC driver 110 instead of the macvtap module 116. When the VF NIC driver 110 has new network packets for the Rx vring 109, it provides the updated index for the Rx vring 109. Here, the network packets are always consumed in the order they are received by the Rx vring 109. When the vhost-net module 112 detects a packet available for the Rx vring 109, it needs to update the virtio descriptors (not shown) and start the VM 104 without any additional copying overhead.

This approach bypasses macvtap module 116 entirely, which provides the abstraction between kernel buffers in the VF NIC driver 110 and guest memory buffers in the vhost-net module 112. By eliminating the macvtap module 116 from the data packet Rx path, the vhost-net module 112 is configured to provide details of the Rx vring 109 to the VF NIC driver 110 directly. The virtio device 111 in the VM 104 then proceed to complete Rx processing of the packet received in the Rx vring 109, wherein the virtio device 111 does not need to be modified in any way and it continues to allocate buffers in the usual way.

Note that the macvtap module 116 needs to be eliminated only from the data packet Rx path, wherein the macvtap module 116 may continue to be used to establish the connection from the virtio device 110 in the VM 104 to the VF NIC driver 110 of the host 102 as there is no change to qemu module 114. Here, the qemu module 114 creates a tunnel descriptor (not shown) and connects the virtio device 111 of the VM 104 and the physical NIC 120 using the tunnel. As a result, only the macvtap module 116 involved in the data transfer knows the actual mapping of the virtio device 111 to the physical NIC 120. When the virtio device 111 is associated with the VM 104 using virtio, the qemu module 114 is configured to create the macvtap module 116 and then call into the vhost-net module 112 to associate forwarding function of the macvtap module 116 (macvtap fd) with the virtio device 111. The vhost-net module 112 is then configured to extract the association between the virtio device 111 and the physical NIC 120 from the macvtap module 116 and store mapping between the virtio device 111 to the NIC 120 with itself. In some embodiments, an application program interface (API) is implemented in the macvtap module 116 for a function that can be called by the vhost-net module 112 to extract the association between the virtio device 111 and the physical NIC 120. When the API is called, the macvtap module 116 is configured to find a netdevice corresponding to the virtio device 111 and return it to the vhost-net module 112, which then calls the VF NIC driver 110 to establish the association between the NIC 120 and the virtio device 111. The API also indicates the new size of the Rx ring of the physical NIC 120 since it now needs to match the size of the virtio Rx vring 109. The API also passes a callback function to the VF NIC driver 110, which would be called by the VF NIC driver 110 to push the packet into the vhost-net module 112. Once this function call is completed, the Rx data path would be modified to bypass the macvtap module 116 even though the tunnel and the associations created by the qemu module 114 continues to exist.

In some embodiments, the VF NIC driver 110 is modified and configured to service the vhost-net module 112 directly under the zero copy implementation for the data packet Rx path. Specifically, when the VF NIC driver 110 is first loaded/initiated, the Rx rings for the VF NIC driver 110 are initialized in the usual way by allocating buffers for the packets and the NIC 120 continue to service the host 102 as a normal Ethernet device. When the virtio device 111 has been created by the qemu module 114 and the association via the macvtap module 116 is completed, the vhost-net module 112 is configured to present the association between the virtio device 111 and the physical NIC 120 to the VF NIC driver 110, which then resets the Rx ring and informs firmware of the NIC 120 to stop sending packets to this ring. The new Rx ring size will be provided by the vhost-net module 112 with no buffers allocated or credited by the VF NIC driver 110 to the physical NIC 120 at this time. The virtio device 111 running in the VM 104 will allocate Rx ring buffers at some point and let the vhost-net module 112 know about the availability of these buffers. The VF NIC driver 110 then populates Rx descriptor ring with these buffers and also provides the buffer addresses to the physical NIC 120, wherein the VF NIC driver 110 maintains the vring index in a separate list to track the Rx vring 109. When packets arrive in the Rx buffers, the VF NIC driver 110 calls the callback provided by vhost-net module 112 to provide the Rx packets to the vhost-net module 112. The virtio handle passed in the callback function identifies the virtio device 111 and the Rx vring 109 to which the packet belongs.

In some embodiments, the VF NIC driver 110 may have multiple Rx rings initially. When the association calls from the vhost_net 112 come into the VF NIC driver 110, it will reset all rings even though only one of them will be associated with the virtio device 111. The other rings will remain in a disassociated state and may be used later for other virtio devices. When a new virtio association happens, the VF NIC driver 110 is configured to select the next available Rx ring for this virtio device till the maximum number of Rx rings have been utilized. When that happens, the VF NIC driver 110 will indicate an error to the vhost-net call and the qemu module 114 will handle this as an error condition and the association would not be formed. When a virtio device is detached, the qemu module 114 makes another call to vhost_net module 112. The vhost-net module 112 calls into the VF NIC driver 110 again and the VF NIC driver 110 puts the Rx ring back in the disassociated state, reset the Rx ring and inform the firmware know that no more packets should be sent on that Rx ring.

In some embodiments, the vhost-net module 112 gets notified whenever the virtio device 111 allocates Rx ring buffers and assigns them a Rx vring 109. The vhost-net module 112 is configured to update the virtio handle for the Rx vring 109 with the updated buffer index that indicates the last descriptor with a buffer available for the virtio device 111 to consume. The vhost-net module 112 also makes a call to push address of the newly available ring buffers to the VF NIC driver 110. Here, the buffer list is an array of physical addresses of the Rx buffers/DMA ring 118 that will be presented to the VF NIC driver 110. The vhost-net module 112 then translates the buffers from the guest virtual address to the host physical address to be presented to the VF NIC driver 110 based on guest regions (guest physical to host virtual) mapping setup by the qemu module 114 at initiation time. The pages that hold the Rx buffers 118 will be locked in memory so that they are not swapped out when the VM 104 goes to sleep to allow DMA into these buffers.

In some embodiments, when the network packet arrives from the physical NIC 120, it is saved (or DMA'ed) into the Rx buffer/DMA ring 118 and the VF NIC driver 110 is interrupted by the physical NIC 120 to begin Rx packet processing. The VF NIC driver 110 is configured to process its Rx DMA ring 118 and identify the virtio device 111 that the Rx ring is associated with. The VF NIC driver 110 would then invoke the callback function registered by the vhost-net module 112. The vhost-net module 112 uses the updated values from the VF NIC driver 110 to determine the number of Rx descriptors it has to process. The callback function adds a function pointer with a virtio handle as parameter to the linked list maintained by the vhost-net module 112 and wakes up the vhost_net thread, which runs through the linked list of functions executing each function including the one registered by the callback function. Note that it is important that packet processing for the virtio device 111 happens only in the vhost_net thread context because the thread uses the virtual addresses supplied by the Qemu 114 to access the Rx buffers 118.

In some embodiments, the packets received are always consumed by the virtio device 111 in the same order as they are in the Rx vring 109 and therefore the index in the Rx vring 109 is a sufficient indication to the vhost-net module 112 about the location of the last Rx packet in the Rx vring 109. The Rx path taken by the packet puts the packet into the VM 104 directly while avoiding memory copying completely. When the vhost-net module 112 detects that the packet is available in the Rx vring 109, it needs to update the virtio descriptors and can starts the virtio device 111 in the VM 104 without any additional copying overhead. Once the virtio device 111 consumes the buffer, it would make the buffer available back to the Rx vring 109. The vhost-net module 112 can then credit them back to the VF NIC driver 110 as discussed above.

During live migration of the VM 104 from one host to another, the vhost-net module 112 is configured to lock pages in VM memory 106 to allow for direct memory access (DMA) to be performed by the physical NIC 120 directly into the buffer without affecting the VM migration process. At the end of the VM migration, the vhost-net module 112 receives a reset indication from the qemu module 114 to unlock the pages for the VM 104 to free up the memory used by the VM 104 on the host.

During the VM migration process, the vhost-net module 112 is configured to track every buffer into which the packets along the data packet Rx path have been copied. In addition, DMA may happen to pages in the VM memory 106 that the virtio device 111 can access but the vhost-net module 112 has not yet provided to the VF NIC driver 110. These pages do not need to be logged as dirty for migration unless the vhost-net module 112 makes them available to the VF NIC driver 110. The packet would be lost to the VM 104 but the behavior would be the same as packets that were queued in macvtap module 116 or the physical NIC 120 with the vhost-net module 112.

Note that when the VM 104 has been migrated to a new host, it is not required that the new host also implement the Tx/Rx zero-copy mechanism described above. The VM 104 is configured to use the virtio device 111 to interact with the vhost-net module 112 on the new host since the vhost-net module 112 to virtio interface is not modified in this solution.

Figure 2:
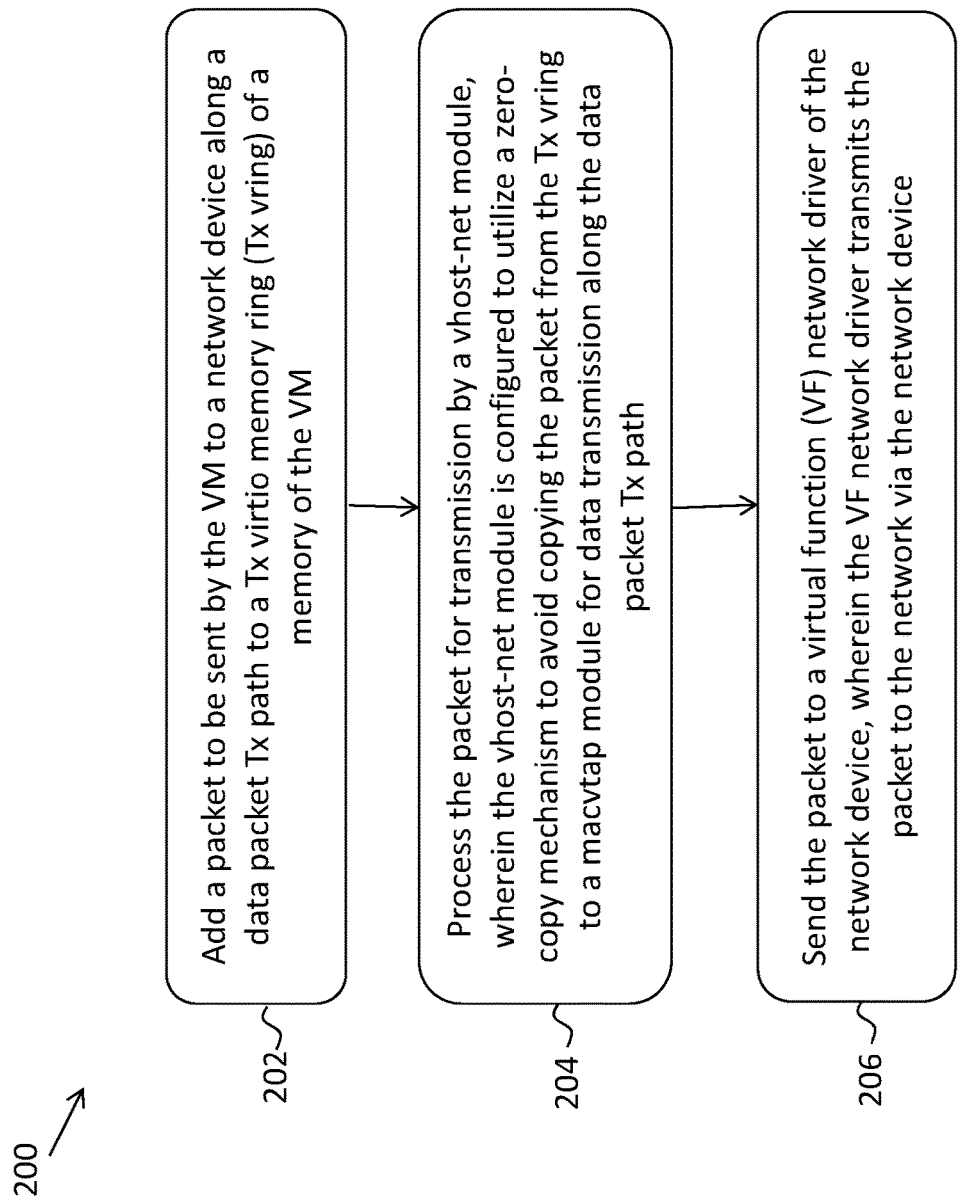
FIG. 2 depicts a flowchart of an example of a process to support virtio-based data packet transmission (Tx) path optimization for live VM migration in accordance with some embodiments.

FIG. 2 depicts a flowchart of an example of a process to support virtio-based data packet transmission (Tx) path optimization for live VM migration. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a packet to be sent by the VM to a network device along a data packet Tx path is added to a Tx virtio memory ring (Tx vring) of a memory of the VM. The flowchart 200 continues to block 204, where the packet is processed for transmission by a vhost-net module, wherein the vhost-net module is configured to utilize a zero-copy mechanism to avoid copying the packet from the Tx vring to a macvtap module for data transmission along the data packet Tx path. The flowchart 200 ends at block 206, where the packet is sent to a virtual function (VF) network driver of the network device, wherein the VF network driver transmits the packet to the network via the network device.

Figure 3:
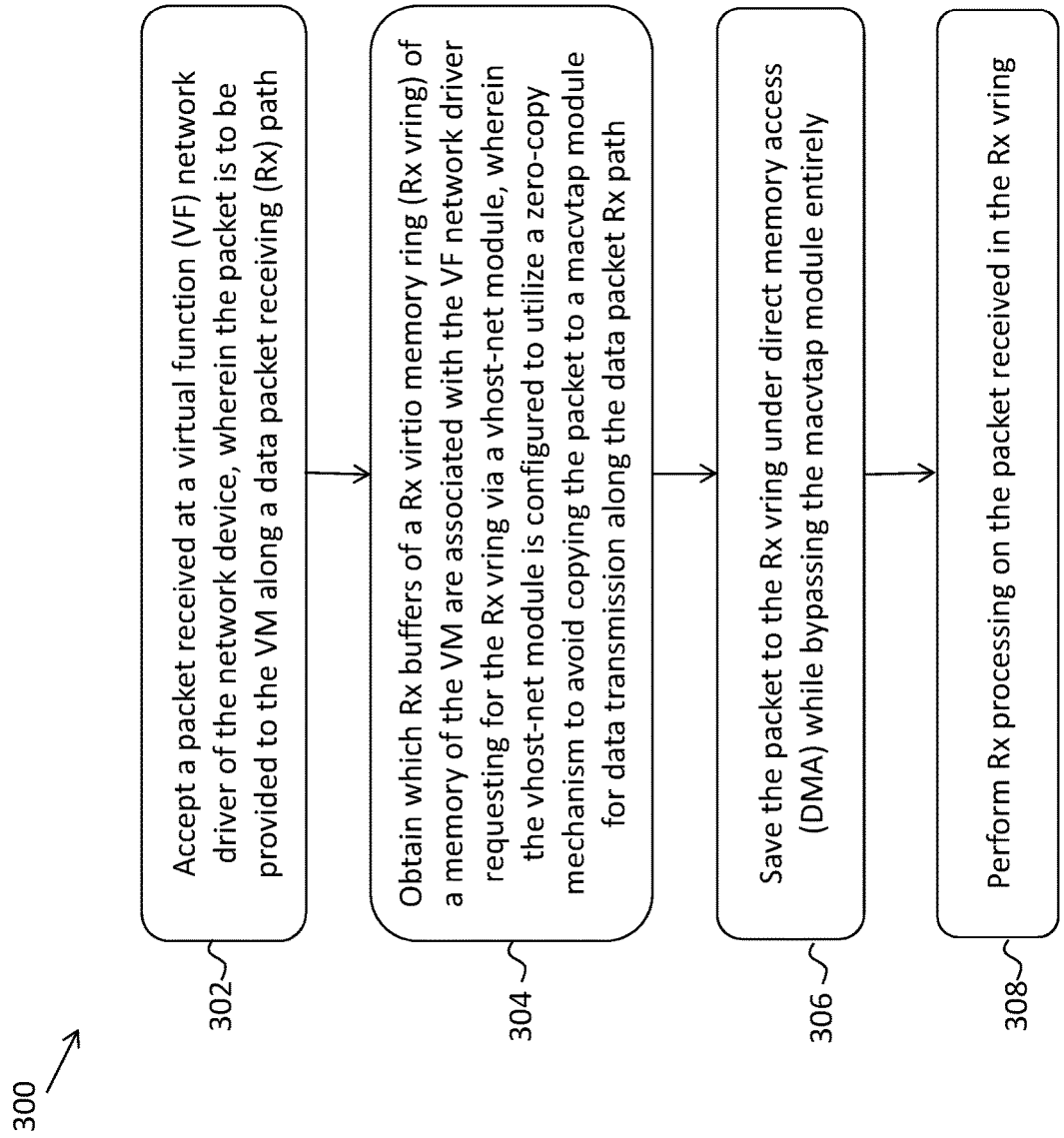
FIG. 3 depicts a flowchart of an example of a process to support virtio-based data packet receiving (Rx) path optimization for live VM migration in accordance with some embodiments.

FIG. 3 depicts a flowchart of an example of a process to support virtio-based data packet receiving (Rx) path optimization for live VM migration. In the example of FIG. 3, the flowchart 300 starts at block 302, where a packet received at a virtual function (VF) network driver of the network device is accepted, wherein the packet is to be provided to the VM along a data packet receiving (Rx) path. The flowchart 300 continues to block 304, where which Rx buffers of a Rx virtio memory ring (Rx vring) of a memory of the VM are associated with the VF network driver request for the Rx buffers from the Rx vring are obtained via a the vhost-net module, wherein the vhost-net module is configured to utilize a zero-copy mechanism to avoid copying the packet to a macvtap module for data transmission along the data packet Rx path. The flowchart 300 continues to block 306, where the packet is saved to the Rx vring under direct memory access (DMA) while bypassing the macvtap module entirely. The flowchart 300 ends at block 308, where Rx processing is performed on the packet received in the Rx vring.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support virtual I/O (virtio)-based data packet receiving (Rx) path optimization for live virtual machine (VM) migration, comprising:
   a host having a VM running on it and in communication with a network device, and the host is configured to
   accept a packet received at a virtual function (VF) network driver of the network device, wherein the packet is to be provided to the VM along a data packet receiving (Rx) path;
   obtain which Rx buffers of a Rx virtio memory ring (Rx vring) of a memory of the VM are associated with the VF network driver requesting for the Rx vring via a vhost-net module, wherein the vhost-net module is a kernel-level backend module configured to utilize a zero-copy mechanism provided by Linux kernel of the host to avoid copying the packet to a macvtap module for data transmission along the data packet Rx path, wherein the macvtap module is a device driver configured to provide a socket that the vhost-net module polls to receive the packets or use send calls to send the packets;
   save the packet to the Rx vring under direct memory access (DMA) while bypassing the macvtap module entirely;
   perform Rx processing on the packet received in the Rx vring.

2. The system of claim 1 wherein:
the host is one of an OCTEON, x86, and ARM based devices.

3. The system of claim 1 wherein:
the networking device is a hardware-based, software-programmable network interface card (NIC).

4. The system of claim 1, wherein:
the vhost-net module is configured to provide details of the Rx vring to the VF network driver directly by eliminating the macvtap module from the data packet Rx path.

5. The system of claim 1, wherein:
the vhost-net module is configured to extract an association between a virtio device of the VM and the network device from the macvtap module and store mapping between the virtio device and the network device with itself.

6. The system of claim 5, wherein:
the vhost-net module gets notified whenever the virtio device allocates and assigns buffers to the Rx vring.

7. The system of claim 1, wherein:
the VF network driver is modified and configured to service the vhost-net module directly under the zero-copy mechanism for the data packet Rx path.

8. The system of claim 1, wherein:
the VF network driver is interrupted by the network device to begin Rx packet processing when the packet is saved to a directly memory accessed (DMA'ed) Rx buffer.

9. The system of claim 1, wherein:
packets received in the Rx vring are consumed by the virtio device in the same order as they are received in the Rx vring and an index in the Rx vring is a sufficient indication to the vhost-net module about the location of the last packet in the Rx vring.

10. The system of claim 1, wherein:
the vhost-net module is configured to lock pages in the memory of the VM to allow for direct memory access (DMA) to be performed by the network device without affecting the live VM migration process.

11. A system to support virtio I/O (virtio)-based data packet transmission (Tx) path optimization for live virtual machine (VM) migration, comprising:
   a host having a VM running on it and in communication with a network device, and the host is configured to add a packet to be sent by the VM to a network device along a data packet Tx path to a Tx virtio memory ring (Tx vring) of a memory of the VM;

process the packet for transmission by a vhost-net module, wherein the vhost-net module is a kernel-level backend module configured to utilize a zero-copy mechanism that modifies a macvtap module to avoid copying the packet from the Tx vring to the macvtap module for data transmission along the data packet Tx path, wherein the macvtap module is a device driver configured to provide a socket that the vhost-net module polls to receive the packets or use send calls to send the packets;

send the packet to a virtual function (VF) network driver of the network device, wherein the VF network driver transmits the packet to the network via the network device.

12. The system of claim 11, wherein:
the Tx vring is presented to the VF network driver by the vhost-net module, wherein the VF network driver selects the packet in the next available slot in the Tx vring and sends the packet to the network device.

13. A method to support virtual I/O (virtio)-based data packet receiving (Rx) path optimization for live virtual machine (VM) migration, comprising:

accepting a packet received at a virtual function (VF) network driver of the network device, wherein the packet is to be provided to the VM along a data packet receiving (Rx) path;

obtaining which Rx buffers of a Rx virtio memory ring (Rx vring) of a memory of the VM are associated with the VF network driver requesting for the Rx vring via the vhost-net module, wherein the vhost-net module is a kernel-level backend module configured to utilize a zero-copy mechanism provided by Linux kernel of the host to avoid copying the packet to a macvtap module for data transmission along the data packet Rx path, wherein the macvtap module is a device driver configured to provide a socket that the vhost-net module polls to receive the packets or use send calls to send the packets;

saving the packet to the Rx vring under direct memory access (DMA) while bypassing the macvtap module entirely;

performing Rx processing on the packet received in the Rx vring.

14. The method of claim 13, further comprising:
providing details of the Rx vring to the VF network driver directly by eliminating the macvtap module from the data packet Rx path.

15. The method of claim 13, further comprising:
extracting an association between a virtio device of the VM and the network device from the macvtap module and store mapping between the virtio device and the network device with itself.

16. The method of claim 15, further comprising:
notifying the vhost-net module gets whenever the virtio device allocates and assigns buffers to the Rx vring.

17. The method of claim 13, further comprising:
modifying the VF network driver to service the vhost-net module directly under the zero-copy mechanism for the data packet Rx path.

18. The method of claim 13, further comprising:
interrupting the VF network driver to begin Rx packet processing when the packet is saved to a directly memory accessed (DMA'ed) Rx buffer.

19. The method of claim 13, further comprising:
consuming packets received in the Rx vring in the same order as they are received in the Rx vring and an index in the Rx vring is a sufficient indication to the vhost-net module about the location of the last packet in the Rx vring.

20. The method of claim 13, further comprising:
locking pages in the memory of the VM to allow for direct memory access (DMA) to be performed by the network device without affecting the live VM migration process.

21. A method to support virtual I/O (virtio)-based data packet transmission (Tx) path optimization for live virtual machine (VM) migration, comprising:

adding a packet to be sent by a VM to a network device along a data packet Tx path to a Tx virtio memory ring (Tx vring) of a memory of the VM;

processing the packet for transmission by a vhost-net module, wherein the vhost-net module is a kernel-level backend module configured to utilize a zero-copy mechanism that modifies a macvtap module to avoid copying the packet from the Tx vring to a macvtap module for data transmission along the data packet Tx path, wherein the macvtap module is a device driver configured to provide a socket that the vhost-net module polls to receive the packets or use send calls to send the packets;

sending the packet to a virtual function (VF) network driver of the network device, wherein the VF network driver transmits the packet to the network via the network device.

22. The method of claim 21, further comprising:
presenting the Tx vring to the VF network driver by the vhost-net module, wherein the VF network driver selects the packet in the next available slot in the Tx vring and sends the packet to the network device.

23. The system of claim 1, wherein the identified Rx buffers are directly accessed by the VF network driver.

* * * * *